Sept. 30, 1952 R. O. GRAY 2,612,545

TELEVISION RECEIVER OUTPUT TRANSFORMER

Filed Feb. 11, 1950

RICHARD O. GRAY
*INVENTOR.*

BY Francis W. Crotty
HIS ATTORNEY

Patented Sept. 30, 1952

2,612,545

UNITED STATES PATENT OFFICE 2,612,545

TELEVISION RECEIVER OUTPUT TRANSFORMER

Richard O. Gray, Broadview, Ill., assignor to Zenith Radio Corporation, a corporation of Illinois Application February 11, 1950, Serial No. 143,713

4 Claims. (Cl. 175—356)

This invention relates to electrical transformers, and more particularly to a coupling or output transformer of the type utilized in a television receiver for supplying deflection currents to the deflection elements of the cathode-ray image-reproducing tube and for producing high-potential pulses for excitation of the voltage-supply network for the anode of this tube.

Television receivers utilizing the principle of electro-magnetic deflection in the cathode-ray image-reproducing tube usually include a power-output electron-discharge device. This device is connected to deliver deflection current through a coupling transformer to a pair of deflection coils encompassing the neck of the reproducing tube. The coupling transformer usually includes a primary winding connected in the anode-cathode circuit of the power-output discharge device, a low-potential secondary winding connected across the deflection coils of the cathode-ray tube, and a high-potential secondary winding for stepping up the surge potential developed across the transformer during retrace periods of the cathode-ray beam in the image-reproducing tube so that this potential may be rectified and employed as the anode potential for the tube.

In the construction of such transformers several problems have been encountered in an attempt to reduce the cost thereof as much as possible. One problem, from a cost standpoint, lies in the provision of suitable yet economical terminal-supporting means for the various leads extending to the several windings of the transformer. One of these leads is usually established at a potential of the order of 15 kilovolts and another at a potential of the order of 5 kilovolts, and it is, therefore, necessary that these leads be adequately insulated from the other leads of the transformer.

In an attempt to overcome this problem, a transformer has been devised having a pair of strips of plastic material secured to opposite sides of the assembly. These strips carry the various terminals of the transformer connected to the primary and low-potential secondary winding. The leads extending to the high-potential secondary winding of the transformer are secured to these strips to remove the strain from the secondary winding itself. This type of transformer is not only unnecessarily costly, but is also cumbersome in appearance and requires a material portion of the limited available space in the television receiver.

It is an object of the present invention to provide an improved and inexpensive transformer for coupling the deflection-signal output stage of a television receiver to the deflection elements and anode voltage-supply network of the receiver cathode-ray image-reproducing tube.

A further object of this invention is to provide such an improved coupling transformer that is compact in size, rugged in construction and which entails no extraneous space-consuming components.

The features of this invention which are believed to be new are set forth with particularity in the appended claims. The invention itself, however, together with further objects and advantages thereof may best be understood by reference to the following description when taken in conjunction with the accompanying drawings, in which:

Figure 1:
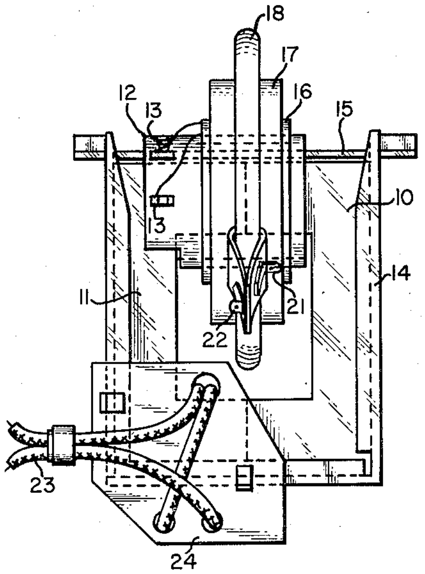
Figure 1 shows a side view of the transformer of the present invention.
Figure 2:
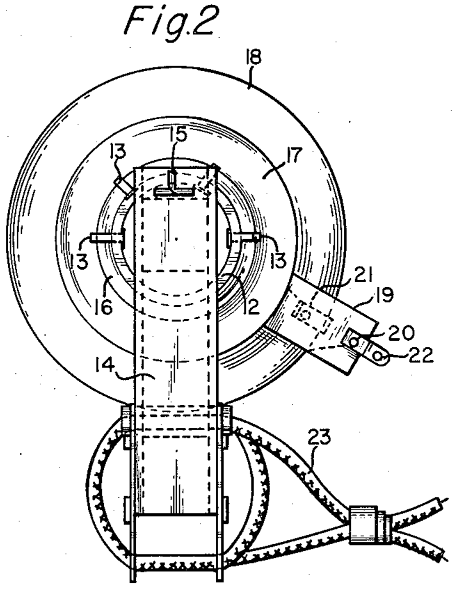
Figure 2 shows an end view thereof.
Figure 3:
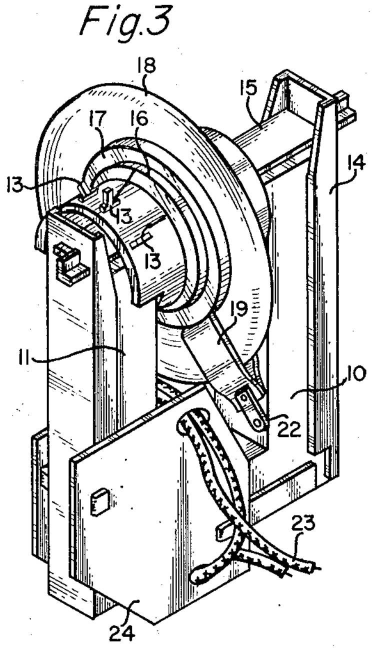
Figure 3 shows a perspective view of the transformer.

Referring now to the drawing, the transformer illustrated therein includes a pair of C-shaped core sections 10 and 11 which may be composed of laminations of silicon steel, moulded powdered iron, moulded iron oxide or any other suitable material. The core sections 10, 11 are positioned to define a hollow core structure and support a tubular coil form 12 on the upper transverse portion thereof. The coil form may be constructed of Bakelite-impregnated paper or other suitable insulating substance. It is preferable that a layer of insulating tape such as fiber-glass separate the coil form 12 from the core sections to provide an insulation between these sections and various terminals which are mounted on the coil form in a manner to be described. The tubular coil form 12 is cut away at one end to receive the upright portion of core section 11. The purpose of this is two-fold; firstly, this configuration of the coil form acts to key it to the core sections and prevent rotation thereof and, secondly, it enables the coil form to have an increased effective length by overlapping the core section 11. A plurality of terminals 13 are fixed to the overlapping portion of the coil form. The core sections 10 and 11 are held together by means of a U-shaped bracket 14 surrounding the sections and secured by means of a strip 15 extending through apertures in the bracket and twisted at each of its extremities.

Figure 4:
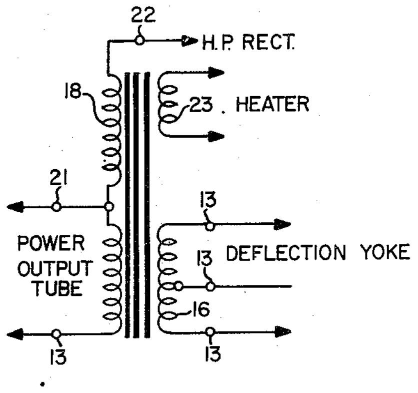
Figure 4 shows a schematic diagram of the transformer.

The low-potential secondary winding of the transformer is indicated 16 and may be wound about the coil form 12, the leads from this winding being connected to a pair of the terminals 13. The primary winding of the transformer is indicated 17 and may be wound concentrically with the low-potential secondary winding 16. One of the leads from the primary winding may be connected to another of the terminals 13 on the coil form 12. The high-potential secondary winding of the transformer is indicated 18 and may be wound concentrically with the other windings 16 and 17 and electrically connected in series with the primary winding 17. An insulating strip 19 is inserted between the windings 17 and 18, and is looped back to encompass an arcuate portion of the winding 18. This strip has its ends riveted together by means of a rivet 20 to hold the strip securely on the winding 18. The strip 19 has a pair of terminals 21 and 22 fixed thereto. The terminal 22 is electrically connected to one extremity of the high-potential secondary winding, and the terminal 21 is connected to the electrical junction of the primary and high-potential secondary winding as shown in Figure 4.

The windings of the transformer assembly may be coated with a wax or other suitable substance to prevent arcing and corona effects from the high-potential secondary winding. This wax is composed preferably of a non-inflammable substance and acts as a fire preventive. Furthermore, the wax may be dyed black to increase heat-transfer from the interior of the transformer to the outer heat-radiating surface.

A further winding may be provided on the transformer to supply heater current to the rectifier tube of the high-potential power supply of the television receiver. This winding may comprise a few turns of non-combustible insulated wire 23 wrapped around the core sections and spaced therefrom by means of a pair of non-inflammable strips 24 of any suitable insulating material.

This invention provides, therefore, a highly economical yet rugged and completely satisfactory transformer for coupling the sweep-signal output stage of a television receiver to the deflection elements and to the anode-voltage supply network of a cathode-ray image-reproducing device. The low-potential terminals of the transformer are conveniently mounted on the coil form 12 which is cut away to allow for an increased effective length of the coil form without requiring an increased width of the core sections. The high-potential terminals are carried by the high-potential secondary winding itself and are rigidly fixed thereto by means of the strip 19. These latter terminals are, therefore, sufficiently removed from the low-potential terminals and other parts of the transformer so that any tendency for arcing is obviated.

While a particular embodiment of the invention has been shown and described, modifications may be made, and it is intended in the appended claims to cover all such modifications as fall within the true spirit and scope of the invention.

I claim:

1. A transformer assembly for coupling the sweep-signal output stage of a television receiver to the deflection elements and anode voltage-supply network of a cathode-ray image-reproducing device, said transformer comprising: a pair of magnetic core sections positioned adjacent each other to define a hollow core structure having upright portions and a transverse portion extending therebetween; a hollow coil form mounted coaxially on said transverse portion and cut away at one end to receive one of said upright portions and to provide a section projecting over said one upright portion; a plurality of terminals fixed to said projecting section of said coil form; a first winding wound upon said coil form and having extremities electrically connected to a pair of said terminals; a second winding wound on said first winding in concentric relation therewith and having an extremity electrically connected to another of said terminals; a third winding wound concentrically on said second winding; and a strip of insulating material looped transversely around an arcuate section of and supported by said third winding and having a pair of terminals mounted thereon electrically connected respectively to the extremities of said third winding.

2. A transformer assembly for coupling the sweep-signal output stage of a television receiver to the deflection elements and anode voltage-supply network of a cathode-ray image-reproducing device, said transformer comprising; a pair of magnetic core sections positioned adjacent each other to define a hollow core structure having upright portions and a transverse portion extending therebetween; a hollow coil form mounted coaxially on said transverse portion and cut away at one end to receive one of said upright portions and to provide a section projecting over said one upright portion; a plurality of terminals fixed to said projecting section of said coil form; a first winding wound upon said coil form and having extermities electrically connected to a pair of said terminals; a second winding wound on said first winding in concentric relation therewith and having an extremity electrically connected to another of said terminals; a third winding wound concentrically on said second winding and having one extremity electrically connected to the second extremity of said second winding; a strip of insulating material looped transversely around an arcuate section of said third winding and supported by said third winding; and a pair of terminals mounted on said insulating strip and electrically connected respectively to the common extremities of said second and third windings and to the second extremity of said third winding.

3. A transformer assembly for coupling the sweep-signal output stage of a television receiver to the deflection elements and anode voltage-supply network of a cathode-ray image-reproducing device, said transformer comprising: a pair of magnetic core sections positioned adjacent each other to define a hollow core structure having upright portions and a transverse portion extending therebetween; a bracket circumscribing said core sections for retaining said sections in position; a tape of insulating material surrounding said transverse portion; a hollow coil form mounted coaxially on said transverse portion and cut away at one end to receive one of said upright portions and to provide a section projecting over said one upright portion; a plurality of terminals fixed to said projecting section and insulated from said core sections by said insulating tape; a low-potential secondary winding wound on said coil form and having extremities electrically connected to one pair of said terminals; a primary winding wound concentrically on said low-potential secondary winding and having one extremity connected to another of said terminals; a high-potential secondary winding wound concentrically on said primary winding and having one extremity connected to the second extremity of said primary winding; a strip of insulating material looped transversely around an arcuate section of said high-potential secondary winding and supported thereby; a pair of terminals mounted on said insulating strip and electrically connected respectively to the common extremities of said primary and high-potential secondary windings and to the second extremity of said high-potential secondary winding; and a coating of insulating non-inflammable wax covering said windings to prevent arcing from said high-potential winding.

4. A transformer assembly for coupling the sweep-signal output stage of a television receiver to the deflection elements and anode voltage-supply network of a cathode-ray image-reproducing device, said transformer comprising: a magnetic core structure having upright portions and a transverse portion extending therebetween; a hollow coil form mounted coaxially with said transverse portion having at least one end cut away to receive at least one of said upright portions and to provide a section projecting over said one upright portion; a plurality of terminals fixed to said projecting section of said coil form; a first winding wound coaxially with said coil form and having extremities electrically connected to a pair of said terminals; a second winding wound coaxially with said first winding and having an extremity electrically connected to another of said terminals; a third winding wound coaxially with said second winding; and a strip of insulating material looped transversely around an arcuate section of and supported by at least one of said windings and having at least one terminal mounted thereon and electrically connected to one extremity of said third winding.

RICHARD O. GRAY.

REFERENCES CITED

The following references are of record in the file of this patent:

UNITED STATES PATENTS

| Number | Name | Date |
|---|---|---|
| 1,545,429 | Hunt | July 7, 1925 |
| 1,659,062 | Varley | Feb. 14, 1928 |
| 1,751,854 | Da Costa | Mar. 25, 1930 |
| 1,819,638 | Connor | Aug. 18, 1931 |
| 1,863,713 | Connor | June 21, 1932 |
| 2,184,342 | Grupe et al. | Dec. 26, 1939 |
| 2,438,359 | Clapp | Mar. 23, 1948 |
| 2,449,969 | Wright | Sept. 28, 1948 |
| 2,474,474 | Friend | June 28, 1949 |
| 2,513,161 | Friend | June 27, 1950 |